United States Patent [19]

Baxter et al.

[11] Patent Number: 5,652,928
[45] Date of Patent: Jul. 29, 1997

[54] METHOD AND APPARATUS FOR AUTOMATIC DEPLOYMENT OF CAMERA LENS

[75] Inventors: Dennis Eugene Baxter, East Rochester; James Vergil Leavy, Churchville; Peter Austin Newman; Leonard Richiuso, both of Rochester, all of N.Y.

[73] Assignee: Eastman Kodak Company, Rochester, N.Y.

[21] Appl. No.: 622,774

[22] Filed: Mar. 27, 1996

[51] Int. Cl.⁶ .................................. G03B 13/36
[52] U.S. Cl. ................................................ 396/136
[58] Field of Search ........................ 354/400, 402; 318/685, 599; 396/135, 134, 136, 133

[56] References Cited

U.S. PATENT DOCUMENTS

| | | | |
|---|---|---|---|
| 4,772,909 | 9/1988 | Ogasawara | 354/400 |
| 4,878,077 | 10/1989 | Maeno et al. | 354/400 |
| 4,897,683 | 1/1990 | Suzuki et al. | 354/400 |
| 5,057,859 | 10/1991 | Ishimaru et al. | 354/400 |
| 5,206,677 | 4/1993 | Onuki et al. | 354/400 |
| 5,367,354 | 11/1994 | Kawasaki et al. | 354/400 |

*Primary Examiner*—W. B. Perkey
*Attorney, Agent, or Firm*—Francis H. Boos, Jr.

[57] ABSTRACT

Camera autofocus apparatus and method employing an autoranging device to determine a lens destination focus position in terms of a target number of signal pulses from a lens motion sensor photo-interrupter. A lens drive motor is initially driven at maximum speed by a 100% pulse width modulated drive signal. At a fixed number of signal pulses in advance of the target, the average motor speed is calculated and a reduced pulse with modulated drive signal, determined based on the calculated motor speed, is applied to the drive motor to cause the lens to arrive at a uniform speed at a near destination focus position that is suitable for application of a standard motor stopping routine. During the motor stopping routine, the motor is initially "plugged" (reverse polarity drive signal) and the signal pulse period is monitored until a predetermined period is reached. At this point, the plug is removed and an electrical brake (short circuit) is applied to the motor to bring the lens to a rest at the destination focus position.

10 Claims, 3 Drawing Sheets

| PULSE PERIOD AT 100% PWM | % PWM FOR SECOND DRIVE SIGNAL |
|---|---|
| LESS THAN 190 | 17.0 |
| 190 - 205 | 19.0 |
| 205 - 220 | 22.0 |
| 220 - 235 | 28.0 |
| 235 - 250 | 33.0 |
| 250 - 265 | 36.0 |
| 265 - 280 | 39.0 |
| 280 - 295 | 41.0 |
| 295 - 310 | 47.0 |
| 310 - 325 | 50.4 |
| 325 - 340 | 53.1 |
| 340 - 355 | 55.7 |
| 355 - 370 | 58.2 |
| 370 - 385 | 60.7 |
| 385 - 400 | 63.1 |
| 400 - 415 | 65.5 |
| 415 - 430 | 67.8 |
| 430 - 445 | 70.1 |
| 445 - 460 | 72.3 |
| 460 - 475 | 74.5 |
| 475 - 490 | 76.6 |
| 490 - 505 | 78.6 |
| 505 - 520 | 80.6 |
| 520 - 535 | 82.6 |
| 535 - 550 | 85.2 |
| 550 - 565 | 89.7 |
| 565 - 580 | 91.8 |
| GREATER THAN 580 | 100.0 |

FIG. 5

METHOD AND APPARATUS FOR AUTOMATIC DEPLOYMENT OF CAMERA LENS

FIELD OF THE INVENTION

The invention relates to autofocus still cameras and more specifically to a method and apparatus for accurately and reliably deploying a taking lens from a reference position outwardly to a destination focus position.

BACKGROUND OF THE INVENTION

Autofocus cameras are well known that move a camera taking lens outwardly from a reference or home position to a destination focus position at which a desired subject image will be in focus at the film plane. The destination focus position is typically determined by an autoranging sensor that determines the focus range of the subject and computes the desired position of the lens. Various techniques have been suggested for achieving rapid movement of the lens to the focus position and ensuring that the lens, in fact, stops at the focus position without stopping prematurely or overshooting the position.

U.S. Pat. No. 4,878,077 is exemplary of a common technique that attempts to control movement of the lens as it approaches the focus position to conform to a preset deceleration curve. In U.S. Pat. No. 5,057,859, actual encoder pulses generated during motion of the lens are compared repetitively with a number of encoder pulses required to reach the focus position on the basis of the then current lens motion speed and motor braking is applied when the lens reaches the focus position. These techniques rely on constant comparison of the lens action with reference data and are unduly complicated and time consuming in their operation. For economic and efficiency reasons, there is a need for a more simple and rapid operation that does not rely on constant checking of the lens during its movement.

SUMMARY OF THE INVENTION

In accordance with the invention, therefore, there is provided a method of automatically positioning a camera lens during an autofocus operation comprising the steps of initiating a picture taking sequence, determining a destination focus position of the lens, and enabling a lens motor drive with a first motor drive signal to initiate movement of the lens toward the focus destination position. At a first intermediate position in advance of the destination focus position, a second motor drive signal is set that will result in the lens arriving at a near focus destination position at a predetermined arrival speed and the motor drive is operated with this second motor drive signal until the lens reaches the near focus destination position. When the lens arrives at the near focus destination position, a predetermined motor stopping sequence is initiated that results in stopping of the motor at the desired position.

In accordance with another aspect of the invention, apparatus for deploying a camera taking lens outwardly to a destination focus position comprises means for initiating a picture taking operation, means for determining a subject range and a destination focus position for the lens corresponding to the subject range, and a taking lens motor drive responsive to a motor drive signal for moving the taking lens toward the destination focus position. The apparatus also includes control means for initiating movement of the taking lens in response to a first drive signal. At an intermediate position in advance of the destination position, the micro-controller changes to a second drive signal which is determined on the basis of motor drive speed at the intermediate position and that will cause the lens to arrive at a near destination focus position at a predetermined motor speed. When the lens reaches the near destination focus position, the micro-controller initiates a predetermined motor stopping sequence that stops the lens at the destination focus position.

In accordance with a particular feature of the invention, the destination focus position is determined as a function of signal pulses generated during movement of the lens. The lens is initially driven at a maximum speed by a first drive signal. At a fixed number of signal pulses in advance of the destination focus position, the speed of the drive motor is determined and, on the basis of the determined speed, a second drive signal is determined, preferably by reference to a lookup table in the camera controller, and applied to the motor such that the motor will bring the lens to a predetermined arrival speed at a near focus position. Upon arrival at the near destination focus position, defined as a fixed small number of signal pulses in advance of the destination position, the motor drive signal is reversed and the period of the signal pulses is monitored. When the pulse period reaches a predetermined value, an electrical brake is applied to the motor to cause it to stop the lens at the desired destination focus position. A particular advantage of this arrangement is that the motor may activated initially with a maximum drive signal to initiate rapid initial movement of the lens toward the destination focus position. The actual motor speed achieved will be a function of camera operating parameters such as battery potential, ambient temperature and the like. Regardless of the potential variability in this initial drive speed, the selection of a speed based drive at a fixed remaining distance, in signal pulses, from the destination assures that the lens will arrive at the focus position with a desired arrival speed that enables a simple stopping routine that assures proper stopping of the lens at the destination focus position.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIG. 5 is a chart of a lookup table relating motor drive speed to pulse width modulation of a lens motor drive signal that will result in the lens arrival speed near a destination focus position being at a predetermined speed.

DETAILED DESCRIPTION OF THE INVENTION

Figure 1:
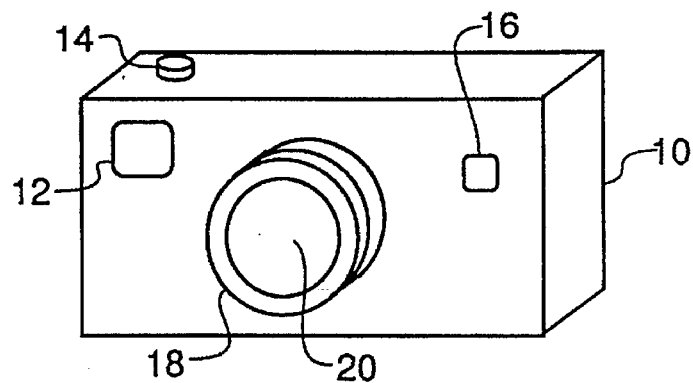
FIG. 1 is a schematic illustration of a camera employing autofocus lens deployment.
Figure 2:
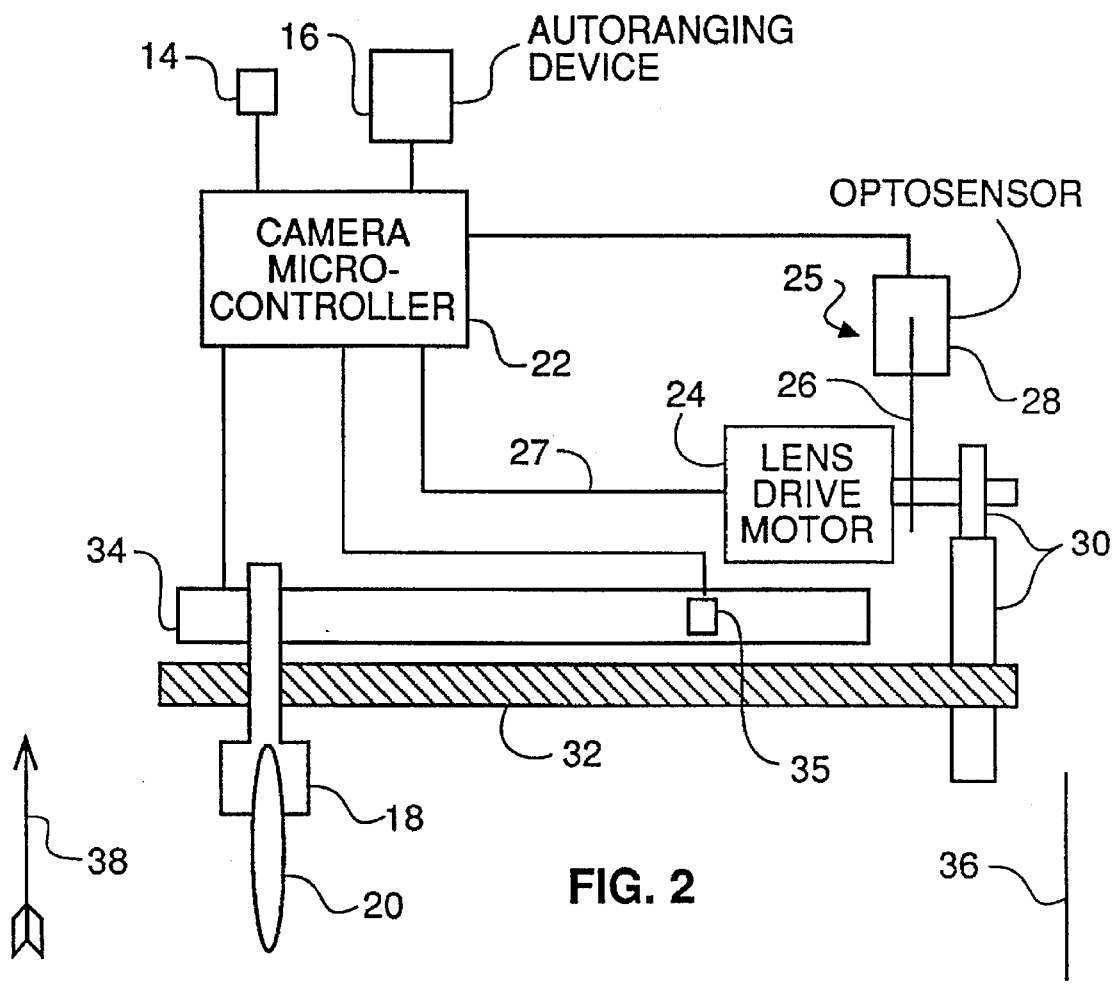
FIG. 2 is a schematic representation of apparatus for autofocus deployment of a camera lens in accordance with the invention.

In FIG. 1 an autofocus camera 10 includes a viewfinder 12 and a shutter release button. A conventional auto ranging device 16 is employed to measure the distance to a photographic subject 38 (FIG. 2). A photographic taking lens 20 is secured in a lens mount 18 which is deployable outwardly to position the lens at a destination focus position as described below.

Referring to FIG. 2, apparatus for deploying a camera taking lens outwardly to a destination focus position comprises means including shutter release button 14 for initiating a picture taking operation. Autoranging device 16 comprises means for determining a subject range and a destination focus position for the lens corresponding to the subject range. A part of the calculation of the destination focus position is performed in camera micro-controller 22. A taking lens drive motor 24 is responsive to a motor drive signal from camera micro-controller 22 for moving the taking lens 20 toward the destination focus position. For this purpose, the shaft of motor 24 is coupled via drive gears 30 to a lens drive shaft 32 which cooperates with lens mount 18 to drive the lens 20 out and back depending on the direction of rotation of the drive motor 24. A lens position indicator of known design provides a signal to micro-controller 22 which is indicative of the position of the lens within its normal focus range. Contact 35 represents a reference position of the lens from which other positions in the focus range can be specified.

A photo-interrupter device 25 includes an optosensor 28 and an encoder wheel 26 that generates signal pulses in response to movement of lens 20 toward the destination focus position. The encoder wheel is attached to the drive shaft of motor 24 and is rotatable therewith such that the ON/OFF period of the signal pulses varies with the speed of the motor drive. It will be appreciated that the speed of the motor drive and, correspondingly, the period of the signal pulses is proportional to the velocity of the lens motion during its movement toward the destination focus position.

Figure 4:
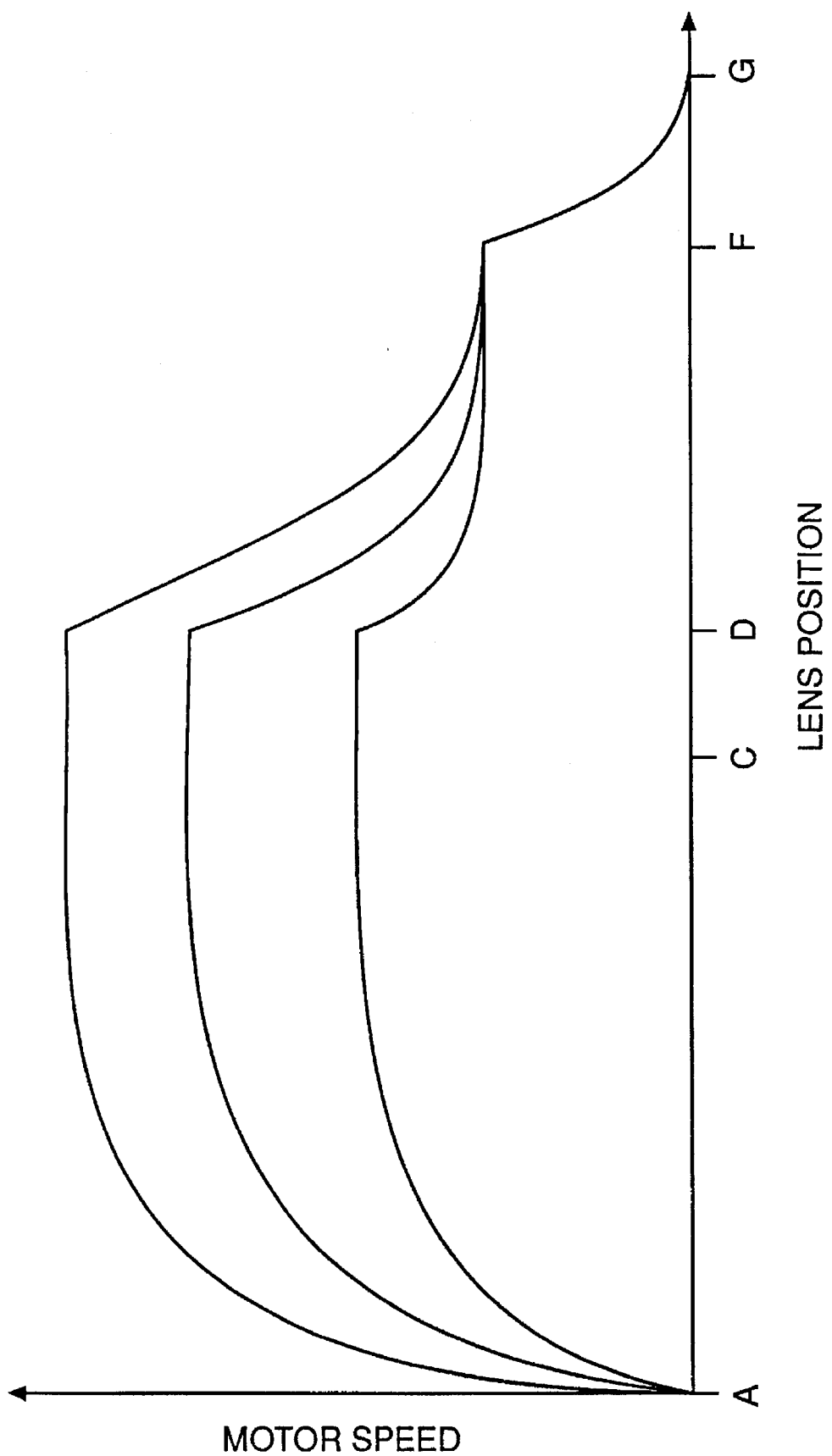
FIG. 4 is a graph of motor speed versus lens position illustrating the lens deployment operation of the invention.

Micro-controller 22 comprises control means for initiating movement of the taking lens 20 toward the destination focus position in response to a first drive signal on line 27 and, at a fixed distance in advance of the destination focus position, changing to a second drive signal which is determined on the basis of the motor drive speed at the intermediate position and that will cause the lens to arrive at a near destination focus position at a predetermined motor speed. The intermediate fixed distance and the near destination focus positions are each expressed in terms of the number of signal pulses in advance of the target number of pulses between the lens reference starting position and the determined lens position at which a subject 38 will be in focus at the film plane 36 in the camera. In a preferred embodiment of the invention, the intermediate position is 130 pulses in advance of the target and the near destination focus position is 4 pulses in advance of the target. Preferably, the motor drive signal is a pulse width modulated signal which controls the speed of the motor in proportion to the percentage width modulation of the drive signal. It will be appreciated, of course, that other types of drive signals may be used to control the speed of motor 24. Initially, the drive signal is turned on at 100% modulation (full on) to drive the motor and lens at maximum available speed. Even though the a maximum drive signal is employed, the actual speed achieved is a variable dependent on the operating conditions of the camera (battery potential, ambient temperature, etc.), as shown in FIG. 4 by exemplary curves 40–42.

Figure 3:
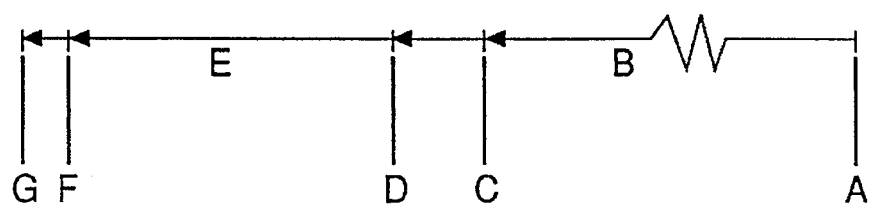
FIG. 3 is a graphical diagram showing the method of autofocus lens deployment in accordance with the invention.

FIG. 3 graphically illustrates the movement of the lens, to the left, during autofocus operation beginning from reference position A corresponding to switch contact 35 on position indicator 34. In operation, when a picture taking sequence is initiated by depressing shutter release button 14, the distance range of subject 38 is determined by autoranging device 16, and the information is passed to micro-controller 22 which then calculates a target number of signal pulses from photo-interrupter 25 between reference position A and the destination focus position G of the lens 20. The micro-controller then turns the motor on at 100% pulse width modulation to initiate movement of the lens through the initial range B at maximum speed. During this period, micro-controller 22 compares the number of pulses from photo-interrupter 25 to the target number and when the remaining number of pulses reaches 130, corresponding to position C, the micro-controller calculates the motor speed from the period of the signal pulses. In a preferred embodiment, the calculation is performed by measuring the period of ten successive pulses, while the lens travels from position C to position D, and calculating the average of the ten pulse periods which is proportional to the motor speed and the velocity of the lens movement. At position D, 120 pulses from the target, the micro-controller determines from a lookup table such as shown in FIG. 5, a pulse width modulation percentage for a second motor drive signal to be applied to motor 24 while driving the lens through range E. The pulse width modulation values of the lookup table are empirically determined values that when applied to the motor 24, based on the average motor speed determined during period C–D, will cause the lens to move at a selected reduced speed, as indicated in FIG. 4 by curves 43–45 through range E that will result in the lens arriving at the near destination focus position F, 4 pulses short of the target number, at a uniform arrival speed irrespective of the maximum speed reached during the initial range B. This allows the use of a simple and uniform motor stopping sequence that reliably stops the lens at the destination focus position G.

Upon reaching position F, 4 pulses short of target, the micro-controller initiates the motor stopping routine by applying an opposite polarity drive signal to motor 24 ("plug") which attempts to reverse the direction of motor rotation. The micro-controller monitors the period of the signal pulses from photo-interrupter 25 and when the pulse period reaches a preset value, 2 ms in the preferred embodiment, the micro-controller turns the plug off and applies an electrical brake, i.e. short circuit, to stop the motor with the lens coming to rest at the destination focus position G. Monitoring of the pulse period during the stopping routine ensures that the motor is turned off before it actually stops and begins reverse rotation which would leave the lens in an unknown position short of the destination focus position.

The invention has been described with reference to a preferred embodiment. However, it will be appreciated that variations and modifications can be effected by a person of ordinary skill in the art without departing from the scope of the invention.

PARTS LIST 10 camera
12 viewfinder
14 shutter release button
16 auto ranging device
18 deployable lens mount
20 taking lens
22 micro-controller
24 lens drive motor 26 opto interrupter disk
28 opto sensor
30 drive gears
32 drive shaft
34 lens position sensor
35 lens "home" reference position switch
36 film plane
38 subject

What is claimed is:

1. A method of automatically positioning a camera lens during an autofocus operation comprising the steps of:

initiating a picture taking sequence;

determining a destination focus position of the lens;

enabling a lens motor drive with a first motor drive signal to initiate movement of the lens from a starting position toward the focus destination position generating signal pulses as a function of movement of the lens, the destination focus position being a determined number of said signal pulse away from said lens starting position;

at a first intermediate position in advance of the destination focus position, calculating motor drive speed and determining, from said calculated motor drive speed, a second motor drive signal that will result in the lens arriving at a near focus destination position at a predetermined arrival speed;

operating said motor drive with said second motor drive signal until the lens reaches said near focus destination position; and when the lens arrives at the near focus destination position, initiating a predetermined motor stopping sequence.

2. The method of claim 1 wherein said motor speed is calculated as an average motor speed over a predetermined number of signal pulses following which said motor drive is operated from said second motor drive signal determined from said average motor speed.

3. Apparatus for deploying a camera taking lens outwardly to a destination focus position comprising:

means for initiating a picture taking operation;

means for determining a subject range and a destination focus position for the lens corresponding to the subject range;

a taking lens motor drive responsive to a motor drive signal for moving the taking lens toward the destination focus position; and control means for initiating movement of said, taking lens toward the destination focus position in response to a first drive signal and, at an intermediate position a fixed distance in advance of the destination position, for changing to a second drive signal determined on the basis of motor drive speed at the intermediate position that will cause the lens to arrive at a near destination focus position at a predetermined motor speed and, when said lens reaches said near destination focus position, for initiating a predetermined motor stopping sequence.

4. The apparatus of claim 3 further including means for generating signal pulses in response to movement of the lens toward the destination focus position and said destination focus position is determined as a target number of signal pulses corresponding to movement of the taking lens from a reference position to the destination focus position; said intermediate position is a first fixed number of signal pulses in advance of said target number of signal pulses and said near destination focus position is a second, substantially lesser number of signal pulses in advance of the destination focus position.

5. The apparatus of claim 4 wherein said control means is operative to determine said second drive signal based on an average motor speed calculated at said intermediate position over a predetermined range of signal pulses.

6. The apparatus of claim 5 wherein said control means determines said second drive from a lookup table of average motor speeds versus second drive signals.

7. The apparatus of claim 4 wherein said signal pulses have a period which varies with speed of the motor drive; and said controller is operative during said motor stopping sequence to apply a reverse current drive signal to the motor drive when the lens reaches said near focus destination position and is then operative to monitor the period of the signal pulses and when said period reaches a predetermined value, applying an electrical brake to the motor drive to stop the lens at the destination focus position.

8. A method of automatically positioning a camera lens during an autofocus operation comprising the steps of:

initiating a picture taking sequence;

determining a destination focus position of the lens;

enabling a lens motor drive with a first motor drive signal to initiate movement of the lens toward the focus destination position;

calculating motor speed at a first intermediate position a fixed distance in advance of the destination focus position;

determining and setting a second motor drive signal based on said calculated motor speed that will result in the lens arriving at a near focus destination position at a predetermined arrival speed and operating said motor drive with said second motor drive signal until the lens reaches said near focus destination position; and when the lens arrives at the near focus destination position, initiating a predetermined motor stopping sequence.

9. The method of claim 8 wherein said first and second motor drive signals are pulse width modulated signals, and said second motor drive signal has a pulse width modulation less than that of said first motor drive signal.

10. A method of automatically positioning a camera lens during an autofocus operation comprising the steps of:

initiating a picture taking sequence;

determining a destination focus position of the lens;

enabling a lens motor drive with a first motor drive signal to initiate movement of the lens toward the focus destination position;

generating signal pulses as a function of movement of the lens, the destination focus position being a function of the number of said signal pulses from a starting position of the lens to the focus destination position;

at a first intermediate position a fixed distance in advance of the destination focus position, setting a second motor drive signal that will result in the lens arriving at a near focus destination position at a predetermined arrival speed and operating said motor drive with said second motor drive signal until the lens reaches said near focus destination position, said first intermediate position being a first predetermined number of signal pulses in advance of said destination position and said near focus position being a second predetermined number of signal pulses in advance of the destination focus position, said second predetermined number of signal pulses being less than said first predetermined number of signal pulses; and when the lens arrives at the near focus destination position, initiating a predetermined motor stopping sequence wherein said motor stopping sequence comprises the steps of reversing current in said lens motor drive when the lens reaches a position corresponding to said second predetermined number of signal pulses; thereafter monitoring the duration of each signal pulse; and, when the signal pulse duration reaches a predetermined value, applying an electrical brake to cause said lens motor drive to stop at said destination position.

* * * * *